US012541738B2

(12) United States Patent
Kim et al.

(10) Patent No.: US 12,541,738 B2
(45) Date of Patent: Feb. 3, 2026

(54) METHODS AND SYSTEMS FOR MONITORING ON-SHELF INVENTORY AND DETECTING OUT OF STOCK EVENTS

(71) Applicant: Walmart Apollo, LLC, Bentonville, AR (US)

(72) Inventors: Sung H. Kim, Bentonville, AR (US); Asim S. Alvi, Kendall Park, NJ (US); Jody P. Cook, New York, NY (US); Kshitiz Gupta, Jersey City, NJ (US); Christopher R. Jescheling, Bentonville, AR (US); Rahul S. Kala, Jersey City, NJ (US); Britto J. Michaelsamy, Bentonville, AR (US); Maxwell A Yardley, Redmond, WA (US); Matthew A. Jones, Bentonville, AR (US); Kumar Chandan, Newark, NJ (US); Jadran Sirotkovic, Dublin (IE); Mirko A. Arnold, Dublin (IE); Peter M. Terlecky, Yonkers, NY (US); Tirui Wu, Tuam (IE)

(73) Assignee: Walmart Apollo, LLC, Bentonville, AR (US)

( * ) Notice: Subject to any disclaimer, the term of this patent is extended or adjusted under 35 U.S.C. 154(b) by 454 days.

(21) Appl. No.: 17/920,692

(22) PCT Filed: Apr. 14, 2021

(86) PCT No.: PCT/US2021/027199
§ 371 (c)(1),
(2) Date: Oct. 21, 2022

(87) PCT Pub. No.: WO2021/216329
PCT Pub. Date: Oct. 28, 2021

(65) Prior Publication Data
US 2023/0177458 A1    Jun. 8, 2023

Related U.S. Application Data

(60) Provisional application No. 63/013,920, filed on Apr. 22, 2020.

(51) Int. Cl.
*G06Q 10/087* (2023.01)
*G06Q 10/0631* (2023.01)
*G06V 10/82* (2022.01)

(52) U.S. Cl.
CPC ..... *G06Q 10/087* (2013.01); *G06Q 10/06311* (2013.01); *G06V 10/82* (2022.01)

(58) Field of Classification Search
CPC .. G06Q 10/087; G06Q 30/06; G06Q 30/0639; G06V 10/82; G06N 3/045
See application file for complete search history.

(56) References Cited

U.S. PATENT DOCUMENTS 6,142,317 A   11/2000   Merl
7,631,808 B2  12/2009   Kundu
(Continued)

FOREIGN PATENT DOCUMENTS

WO   2009061434 A1   5/2009
WO   2018203512 A1   11/2018
(Continued)

OTHER PUBLICATIONS

U.S. Appl. No. 17/522,756, filed Nov. 9, 2021, Dhanashree Palande.
(Continued)

*Primary Examiner* — Florian M Zeender
*Assistant Examiner* — Vanessa Deligi
(74) *Attorney, Agent, or Firm* — Fitch, Even, Tabin & Flannery, LLP

(57) ABSTRACT

Methods and systems for managing inventory at a retail facility include an image capture device having a field of view that includes a product display shelf of the retail
(Continued)

facility, an electronic database that stores defined product display areas and assigned unique identifiers of the products on the product display shelves, and a computing device. The computing device obtains an image of a product display shelf, detects the individual packages of the different products captured in the image, identifies the products associated with the packages detected in the image by utilizing reference information stored in the database, determines whether one or more of the products on the product display shelf is associated with an out of stock event, and transmits an out of stock alert to an electronic device of a worker at the retail facility, notifying the worker to replenish the depleted products on the product display shelf.

21 Claims, 5 Drawing Sheets

(56) References Cited

U.S. PATENT DOCUMENTS

| | | | |
|---|---|---|---|
| 7,909,248 | B1 | 3/2011 | Goncalves |
| 7,962,365 | B2 | 6/2011 | Bobbitt |
| 8,068,674 | B2 | 11/2011 | Goncalves |
| 8,196,822 | B2 | 6/2012 | Goncalves |
| 8,233,702 | B2 | 7/2012 | Gokturk |
| 8,260,456 | B2 | 9/2012 | Siegel |
| 8,448,858 | B1 | 5/2013 | Kundu |
| 8,494,909 | B2 | 7/2013 | Goncalves |
| 8,577,136 | B1 | 11/2013 | Ascher |
| 8,582,802 | B2 | 11/2013 | Clippard |
| 9,299,229 | B2 | 3/2016 | Bobbitt |
| 9,589,433 | B1 | 3/2017 | Thramann |
| 9,727,838 | B2 | 8/2017 | Campbell |
| 9,740,955 | B2 | 8/2017 | Shi |
| 9,820,584 | B2 | 11/2017 | Hardy |
| 10,074,016 | B2 | 9/2018 | Migdal |
| 10,192,208 | B1 | 1/2019 | Catoe |
| 10,349,755 | B2 | 7/2019 | Dipaolo |
| 10,430,776 | B2 | 10/2019 | Svetal |
| 10,614,514 | B2 | 4/2020 | Glaser |
| 10,963,692 | B1 | 3/2021 | Corcoran |
| 11,375,827 | B2 | 7/2022 | Yang |
| 12,299,629 | B2 | 5/2025 | Kim |
| 12,333,813 | B2 | 6/2025 | Horowitz |
| 2005/0021512 | A1 | 1/2005 | Koenig |
| 2009/0039164 | A1 | 2/2009 | Herwig |
| 2009/0090583 | A1 | 4/2009 | Bonner |
| 2009/0272801 | A1 | 11/2009 | Connell, II |
| 2010/0023497 | A1 | 1/2010 | Magdy |
| 2010/0067745 | A1 | 3/2010 | Kovtun |
| 2010/0171826 | A1 | 7/2010 | Hamilton |
| 2010/0217678 | A1 | 8/2010 | Goncalves |
| 2011/0215147 | A1 | 9/2011 | Goncalves |
| 2011/0286628 | A1 | 11/2011 | Goncalves |
| 2012/0203647 | A1 | 8/2012 | Smith |
| 2012/0280040 | A1 | 11/2012 | Carney |
| 2012/0310781 | A1 | 12/2012 | Battle |
| 2012/0321146 | A1 | 12/2012 | Kundu |
| 2013/0066592 | A1 | 3/2013 | Aupetit |
| 2013/0235206 | A1 | 9/2013 | Smith |
| 2014/0129395 | A1 | 5/2014 | Groenovelt |
| 2014/0180865 | A1 | 6/2014 | Argue |
| 2015/0002675 | A1 | 1/2015 | Kundu |
| 2015/0088703 | A1* | 3/2015 | Yan .................. G06Q 10/087 705/28 |
| 2015/0221191 | A1 | 8/2015 | Doyle |
| 2015/0242805 | A1 | 8/2015 | Sakurai |
| 2015/0262116 | A1 | 9/2015 | Katircioglu |
| 2016/0110786 | A1 | 4/2016 | Herring |
| 2016/0132910 | A1 | 5/2016 | Appel |
| 2016/0187199 | A1 | 6/2016 | Brunk |
| 2016/0224857 | A1 | 8/2016 | Zhang |
| 2017/0178061 | A1 | 6/2017 | Griffin |
| 2017/0249491 | A1 | 8/2017 | Macintosh |
| 2017/0262910 | A1 | 9/2017 | Allen |
| 2017/0286773 | A1 | 10/2017 | Skaff |
| 2017/0330059 | A1 | 11/2017 | Novotny |
| 2017/0337508 | A1 | 11/2017 | Bogolea |
| 2018/0096567 | A1 | 4/2018 | Farrow |
| 2018/0110345 | A1 | 4/2018 | Sun |
| 2018/0153313 | A1 | 6/2018 | Padvoiskis |
| 2018/0330196 | A1 | 11/2018 | Chaubard |
| 2019/0005343 | A1 | 1/2019 | Srivastava |
| 2019/0057435 | A1 | 2/2019 | Chomley |
| 2019/0087772 | A1 | 3/2019 | Medina |
| 2019/0156152 | A1 | 5/2019 | Scott |
| 2019/0197560 | A1 | 6/2019 | Migdal |
| 2019/0220690 | A1 | 7/2019 | Johnson |
| 2019/0236363 | A1 | 8/2019 | Bacelis |
| 2019/0236684 | A1 | 8/2019 | Davis |
| 2020/0005225 | A1 | 1/2020 | Chaubard |
| 2020/0074432 | A1 | 3/2020 | Valdman |
| 2020/0118063 | A1* | 4/2020 | Fu .......................... G06F 15/76 |
| 2020/0184270 | A1 | 6/2020 | Omer |
| 2020/0286032 | A1* | 9/2020 | Bogolea .............. G05D 1/0282 |
| 2021/0019725 | A1 | 1/2021 | Xiao |
| 2021/0241208 | A1* | 8/2021 | Tang .................... G06F 16/532 |
| 2023/0120798 | A1 | 4/2023 | Palande |
| 2023/0129852 | A1 | 4/2023 | Horowitz |
| 2023/0131444 | A1 | 4/2023 | Palande |
| 2023/0252407 | A1 | 8/2023 | Kim |
| 2023/0345093 | A1 | 10/2023 | Yepez |
| 2023/0368175 | A1 | 11/2023 | Coverstone |

FOREIGN PATENT DOCUMENTS

| | | | |
|---|---|---|---|
| WO | 2019013711 | | 1/2019 |
| WO | WO-2019140091 A1 * | 7/2019 | ............. H04N 23/51 |
| WO | 2021194882 | | 9/2021 |
| WO | 2021195314 | | 9/2021 |
| WO | 2021195523 | | 9/2021 |
| WO | 2021216329 | | 10/2021 |
| WO | 2021216357 | | 10/2021 |

OTHER PUBLICATIONS

U.S. Appl. No. 17/910,503, filed Sep. 9, 2022, Benjamin R. Ellison.
U.S. Appl. No. 17/914,295, filed Sep. 23, 2022, Dhanashree Palande.
U.S. Appl. No. 17/914,745, filed Sep. 26, 2022, Joshua M. Horowitz.
U.S. Appl. No. 17/920,610, filed Oct. 21, 2022, Sung H. Kim.
Image Annotation.AI; "Image Annotation for Retail Stores | Supermarkets | Image Annotation.ai"; <https://www.imageannotation.ai/retail 1/5>; available at least as early as Feb. 18, 2020; pp. 1-5.
Infosearch; "Image Annotation, Tagging & Data Annotation, Labeling Services for Machine Learning"; <https://www.infosearchbpo.com/image-labeling-annotation.php>; available at least as early as Feb. 18, 2020; pp. 1-3.
Low, Jiayin; "What is Image Annotation?"; <https://medium.com/supahands-techblog/what-is-image-annotation-caf4107601b7>; Jan. 10, 2020; pp. 1-5.
PCT; App. No. PCT/US2021/027199; International Preliminary Report on Patentability mailed Nov. 3, 2022; (14 pages).
PCT; App. No. PCT/US2021/027199; International Search Report and Written Opinion mailed Nov. 8, 2021; (21 pages).
Sridhar et al. "Real-time joint tracking of a hand manipulating an object from rgb-d input." European Conference on Computer Vision. Springer, Cham, 2016. Oct. 16, 2016 (Oct. 16, 2016) Retrieved on May 30, 2021 (May 30, 2021) from <https://arxiv .org/pdf/1610.04889.pdf> (17 pages).
Schroff, F.—"FaceNet: A Unified Embedding for Face Recognition and Clustering"—CVPR 2015, pp. 815-823 (Year: 2015).

* cited by examiner

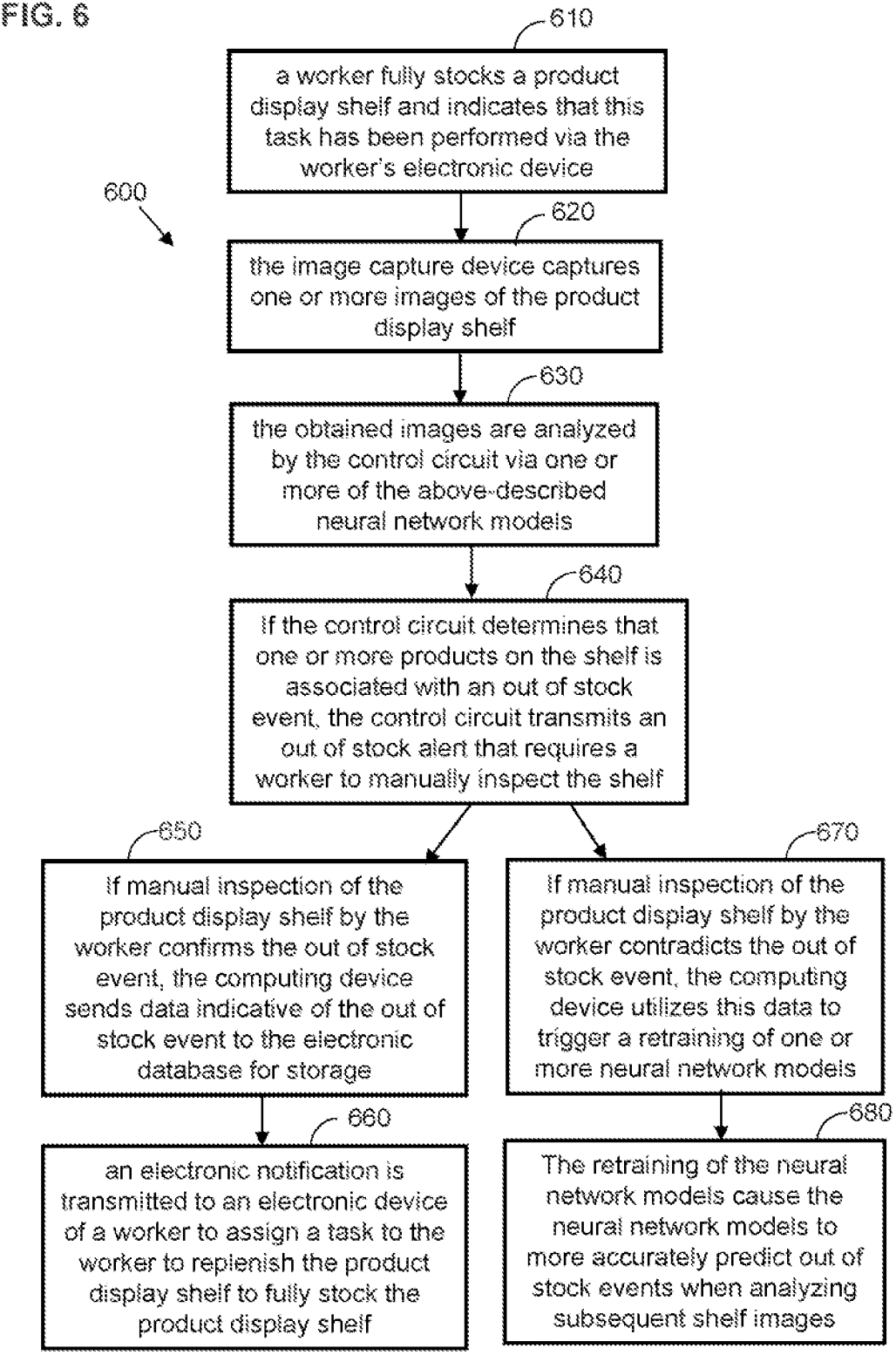

METHODS AND SYSTEMS FOR MONITORING ON-SHELF INVENTORY AND DETECTING OUT OF STOCK EVENTS

This application is a national stage entry of International Application PCT/US2021/027199, filed Apr. 14, 2021, which claims the benefit of U.S. Provisional Application No. 63/013,920, filed Apr. 22, 2020, each of which is incorporated herein by reference in its entirety.

TECHNICAL FIELD

This invention relates generally to managing inventory at a retail facility, and in particular, to systems and methods for monitoring inventory levels of products on product display shelves of the retail facility.

BACKGROUND

A sales floor of a typical retail sales facility such as a large retail store may have hundreds of shelves and thousands of products on the shelves displayed to the consumers. Periodically, products are taken off the shelves and purchased by the consumers. To restock the shelves after products are purchased by the consumers, the products stored in the stock room of the retail sales facility are brought to the shelves on the sales floor to replenish the empty spaces left by the products that were removed by the consumes. If additional products are not timely brought to replenish the shelves, the retail facility may experience a loss of sale due to the out-of-stock status of a given product when a potential buyer approaches a given product display shelf to purchase the product. Such a loss of sale is preventable and very undesirable for retail stores.

It is common for workers of retail sales facilities to manually inspect product display shelves to determine which of the products are adequately stocked and which products are or will soon be out of stock and need to be replenished. Given the very large number of product display shelves and the even larger number of products on the product display shelves at a typical retail facility, such manual inspection of the products on the shelves by the workers is very time consuming and increases the operational for the retail facility, since these workers could be performing other tasks if they were not involved manually inspecting the product display shelves.

BRIEF DESCRIPTION OF THE DRAWINGS

Disclosed herein are embodiments of systems and methods of inventory management at a retail facility. This description includes drawings, wherein:

FIG. 6 is a flow chart diagram indicative of an exemplary logic flow in an exemplary process of detecting out of stock events on a product display shelf.

Figure 1:
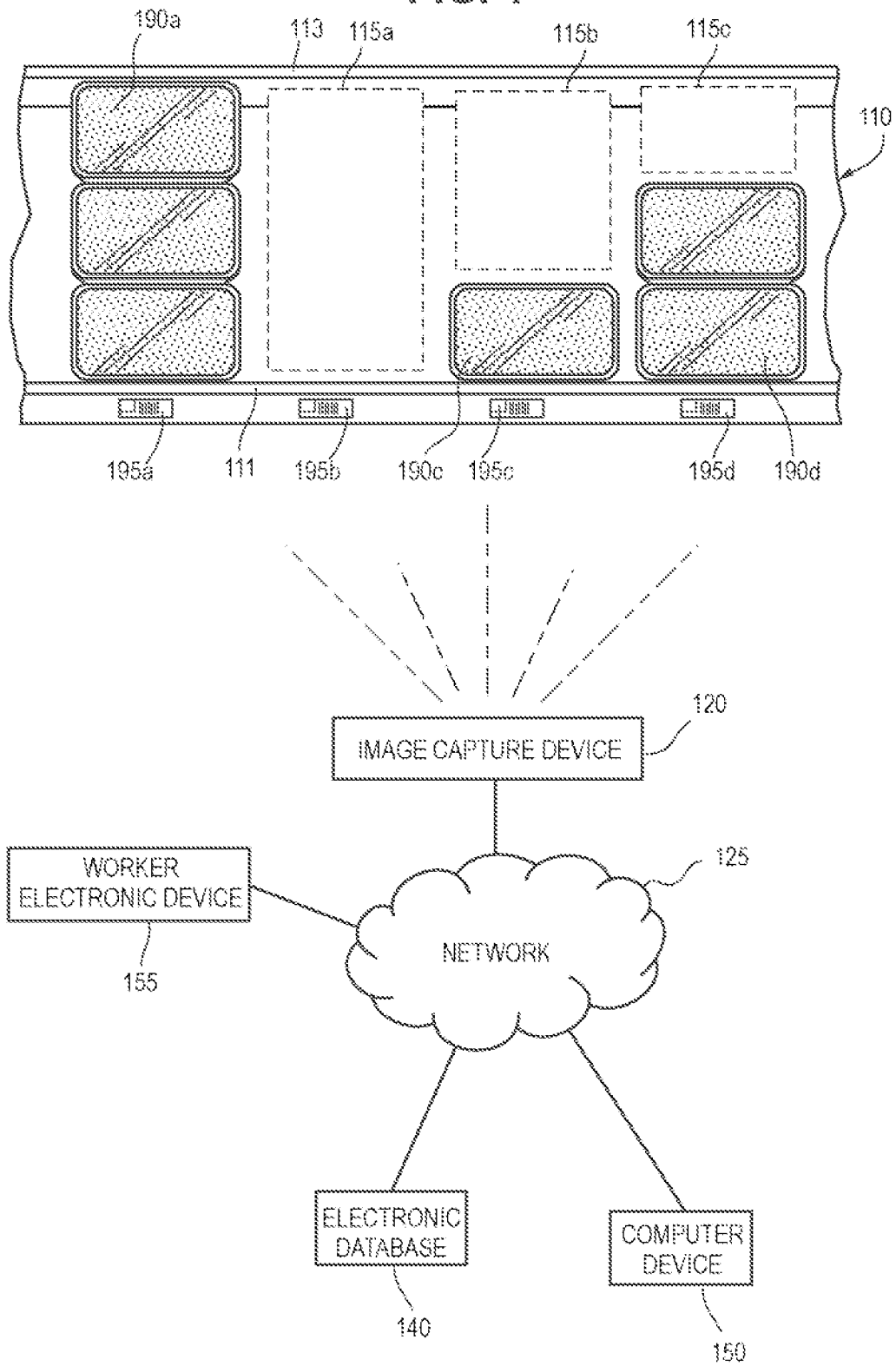
FIG. 1 is a diagram of a system of managing inventory in accordance with some embodiments, depicting a product display shelf having empty spaces caused by removal of certain packages detected thereon.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, methods and systems for managing inventory at a retail facility include an image capture device having a field of view that includes a product display shelf of the retail facility, an electronic database that stores defined product display areas and assigned unique identifiers of the products on the product display shelves, and a computing device. The computing device obtains an image of a product display shelf and detects the individual packages of the different products captured in the image. The computing device also identifies the products associated with the packages detected in the image by using reference information stored in the database, determines if one or more of the products on the product display shelf is associated with an out of stock event, and transmits an out of stock alert to an electronic device of a worker at the retail facility, notifying the worker to replenish the depleted products on the product display shelf. Generally, as used herein, the term "out of stock event" refers to a situation, where either all individual units (e.g., packages, trays, etc.) of a given product are sold out and not present in their designated product display area on the product display shelf, or a situation, where the number of individual units of a given product is equal to or below a predefined minimum unit number (e.g., 1, 2, 3, etc.) that would trigger a replenishment task for the product on the product display shelf.

In some embodiments, an inventory management system for a retail facility includes an image capture device having a field of view that includes a portion of a product display shelf of the retail facility having different products arranged thereon that are offered for sale to consumers at the retail facility. The system also includes an electronic database that stores product display area data indicating reference product display areas associated each of the different products on the product display shelf. Each of the predefined product display areas is associated with individual packages representing one of the different products, and a total number of the individual packages in the reference product display areas indicates a state of the reference product display areas when fully stocked. The system further includes a computing device including a control circuit and communicatively coupled to the image capture device and the electronic database. The control circuit is configured to obtain an image of the portion of the product display shelf captured by the image capture device and correlate the obtained image to the product display area data stored in the electronic database and indicating the reference product display areas associated each of the different products on the product display shelf. This correlation permits the control circuit to identify both the products represented by the individual packages in the portion of the product display shelf in the image and the product display areas stocking the individual packages associated with the identified products. In addition, this correlation permits the control circuit to identify one or more product display areas where at least one of the individual packages of the identified products is associated with an out of stock event. In response to an identification by the control circuit of one or more product display areas that the at least one of the individual packages of the identified products is associated with the out of stock event, the computing device transmits an out of stock alert to an electronic device of a worker at the retail facility, the out of stock alert identifying the one or more product display areas where the at least In some embodiments, a method for managing inventory includes: providing an image capture device having a field of view that includes a portion of a product display shelf of the retail facility having different products arranged thereon that are offered for sale to consumers at the retail facility and providing an electronic database that stores product display area data indicating reference product display areas associated each of the different products on the product display shelf, such that each of the predefined product display areas is associated with individual packages representing one of the different products, and a total number of the individual packages in the reference product display areas indicates a state of the reference product display areas when fully stocked. The method also includes providing a computing device including a control circuit, the computing device being communicatively coupled to the image capture device and the electronic database. The method further includes the following steps by the control circuit: obtaining an image of the portion of the product display shelf captured by the image capture device; correlating the obtained image to the product display area data stored in the electronic database and indicating the reference product display areas associated each of the different products on the product display shelf to: identify both the products represented by the individual packages in the portion of the product display shelf in the image, and the product display areas stocking the individual packages associated with the identified products; and identify one or more product display areas, where one or more of the individual packages of the identified products is associated with an out of stock event. In addition, the method includes transmitting, in response to an identification by the control circuit of one or more product display areas, where the at least one of the individual packages of the identified products is associated with the out of stock event, an out-of-stock alert to an electronic device of a worker at the retail facility, the out-of-stock alert identifying the one or more product display areas, where the at least one of the individual packages of the identified products is associated with the out of stock event.

FIG. 1 shows an embodiment of a system 100 of managing inventory at a retail facility. The system 100 is shown in FIG. 1 for simplicity of illustration with only one image capture device 120 monitoring only one product display shelf 110, but it will be appreciated that, depending on the size of the retail store, the system 100 may include dozens or hundreds of image capture devices 120 located throughout the retail facility that monitor hundreds or thousands of product display shelves 110. Likewise, it will be appreciated that the number of individual packages 190a-190d (i.e., 12) representing four distinct products (i.e., 3 individual packages 190a representing one distinct product (e.g., chicken drumsticks), 3 individual packages 190b representing another distinct product (e.g., chicken wings), 3 individual packages 190c representing yet another distinct product (e.g., sliced ham), and 3 individual packages 190d representing still another distinct product (e.g., sliced turkey breast)) is chosen by way of example only. Further, the size and shape of the individual packages 190a-190d in FIG. 1 have been shown by way of example only, and it will be appreciated that the individual packages 190a-190d may have various sizes and shapes.

The image capture device 120 of the exemplary system 100 depicted in FIG. 1 is configured and positioned to have a field of view that includes at least a portion of one or more product display shelves 110 of the retail facility, and to detect at least one identifying characteristic of the individual packages 190a-190d stocked on the product display shelves 110. According to some embodiments, the image capture device 120 can include one or more sensors including but not limited to a motion-detecting sensor, an optical sensor, a photo sensor, an infrared sensor, a 3D sensor, a depth sensor, a digital camera sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like. In some embodiments, the image capture device 120 is configured to scan identifying indicia (e.g., a label) located on the product display shelf 110, or on the individual packages 190a-190d themselves. The identifying indicia or label that may be scanned by the image capture device 120 may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes.

In some aspects, the image capture device 120 that detects portions of the product display shelf 110 and at least one physical characteristic of the individual packages 190a-190d on the product display shelf 110 is in the form of a digital camera (which could be mounted, for example, on a support structure above the sales floor of the retail facility) that provides for at least one of: image analysis of the individual packages 190a-190d (e.g., size, shape, and color of one or more sides of the product), text recognition (e.g., product name) on the individual packages 190a-190d and/or on the shelf-mounted identifying indicia 195a-195d (e.g., label), and/or pattern (e.g., color, barcode, etc.) recognition on the individual packages 190a-190d, text recognition (e.g., optical character recognition (OCR) of a per unit/weight price indicator, numerical product identifier, a numerical product zone/location identifier, etc.) labels 195a-195d, detection of empty spaces (e.g., 115a, 115b, 115c) between the individual packages 190a-190d. In one aspect, the image capture device 120 generates video image data that includes a timestamp attached to each frame.

In some embodiments, as will be described in more detail below, the images indicative of the physical characteristic and physical location information associated with the individual packages 190a-190d detected by the image capture device 120 are transmitted by the image capture device 120 over a network 130 to an electronic database 140 and/or to a computing device 150. In some aspects, the computing device 150 (or a separate image processing cloud-based service module) is configured to process such images, and the computing device 150 is configured to correlate the information (e.g., raw data, metadata, etc.) extracted from such images to data stored in the electronic database 140, as will be described below.

In some embodiments, the image capture device 120 is a 3D scanner or sensor configured to detect and/or measure the shapes and/or dimensions of the individual packages 190a-190d stocked on the product display shelf 110, and the size of 3D images may be relatively large. In certain implementations, the image capture device 120 is configured to capture an image of the product display shelf 110 having the individual packages 190a-190d stocked thereon, and to compress the captured image prior to transmitting the compressed image to another electronic device (e.g., electronic database 140, computing device 150, etc.). This image compression by the image capture device 120 advantageously reduces the storage requirements of the electronic database 140 (as compared to storing full-size images), and advantageously reduces the processing power required of the computing device 150 to process the compressed image (as compared to the full-size image) when attempting to extract data from the image and/or to detect the physical characteristics and/or physical location of the individual packages 190a-190d based on processing the image captured by the image capture device 120.

The exemplary system 100 includes an electronic database 140. In some embodiments, the electronic database 140 and the computing device 150 may be implemented as two separate physical devices located at the retail facility. It will be appreciated, however, that the computing device 150 and the electronic database 140 may be implemented as a single physical device and/or may be located at different locations relative to each other and relative to the retail facility. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

Generally, the exemplary electronic database 140 of FIG. 1 is configured to store electronic data associated with the physical locations and identities of the products stocked at the retail store. Some exemplary electronic data that may be stored in the electronic database 140 includes but is not limited to: (1) electronic data corresponding to unique identifiers of the individual packages 190a-190d (which may be captured by the image capture device 120 from the identifying indicia 195a-195d (e.g., a label) on the product display shelf 110, or directly from the surface of the individual packages 190a-190d; (2) electronic data corresponding to defined product display areas 160a-160d (see FIG. 2) of product display shelves 110 and indicating physical locations and sizes and shapes of the individual packages 190a-190d stocked on the product display shelves 110 at the retail facility; (3) electronic data indicating the empty spaces 115a-115c detected between the individual packages 190a-190d by the computing device 150; (4) electronic data indicating locations of reference product display areas 160a-160d defined by the computing device 150 for the individual packages 190a-190d representing groups of different products on the product display shelf 110; (5) electronic data representing a total number of the individual packages 190-190d expected to be located in each of the product display areas 160a-160d when the product display areas 160a-160d are fully stocked with the individual packages 190a-190d; (6) electronic data indicating the locations of the shelf labels 195a-195d associated with the individual products 190-190d; and (7) electronic image segmentation data indicating each of the distinct products on the product display shelf 110 in a different color or pattern.

The system 100 of FIG. 1 further includes a computing device 150 configured to communicate with the electronic database 140 and the image capture device over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage.

The computing device 150 may be a stationary or portable electronic device, for example, a desktop computer, a laptop computer, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

In some embodiments, the system 100 includes one or more localized Internet-of-Things (IoT) devices and controllers in communication with the computing device 150. As a result, in some embodiments, the localized IoT devices and controllers can perform most, if not all, of the computational load and associated monitoring that would otherwise be performed by the computing device 150, and then later asynchronous uploading of summary data can be performed by a designated one of the IoT devices to the computing device 150, or a server remote to the computing device 150. In this manner, the computational effort of the overall system 100 may be reduced significantly. For example, whenever a localized monitoring allows remote transmission, secondary utilization of controllers keeps securing data for other IoT devices and permits periodic asynchronous uploading of the summary data to the computing device 150 or a server remote to the computing device 150.

Figure 2:
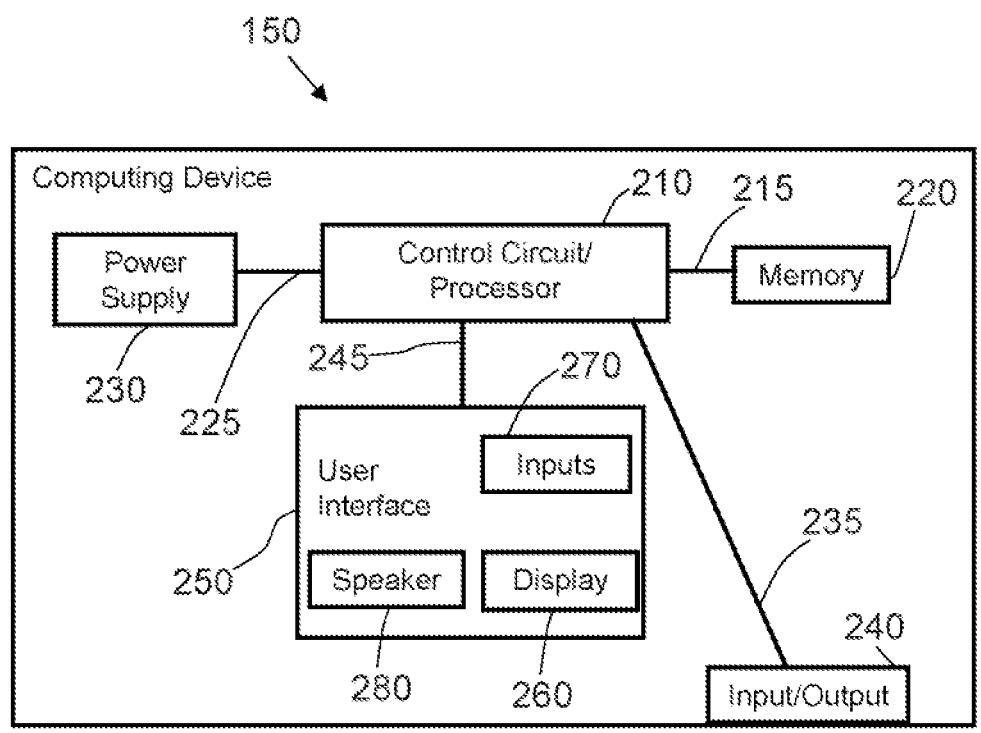
FIG. 2 is a functional diagram of an exemplary computing device usable with the system of FIG. 1 in accordance with some embodiments.

With reference to FIG. 2, the exemplary computing device 150 configured for use with exemplary systems and methods described herein may include a control circuit 210 including a programmable processor (e.g., a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 210 of the computing device 150 is also electrically coupled via a connection 235 to an input/output 240 that can receive signals from, for example, from the image capture device 120, etc., the electronic database 140, and/or from another electronic device (e.g., an electronic device 155 of a worker tasked with physically inspecting the product display shelf 110 and observe the number of individual packages 190a-190d stocked thereon. The input/output 240 of the computing device 150 can also send signals to other devices, for example, an signal to the electronic database 140 that indicates the product display areas 160-160d defined by the computing device 150 on a given product display shelf 110. Also, a signal may be sent, for example, to the electronic device 155 of the worker to task the worker with physically inspecting a given product display shelf 110 to verify whether the control circuit 210 correctly associated an out of stock event with one or more of the individual packages 1900-190d located on the product display shelf 110.

The processor-based control circuit 210 of the computing device 150 shown in FIG. 2 is electrically coupled via a connection 245 to a user interface 250, which may include a visual display or display screen 260 (e.g., LED screen) and/or button input 270 that provide the user interface 250 with the ability to permit an operator of the computing device 150 (e.g., worker at a the retail facility (or a worker at a remote control center) tasked with monitoring the inventory on the product display shelves 110 at the retail facility) to manually control the computing device 150 by inputting commands via touch-screen and/or button operation and/or voice commands. Possible commands may, for example, cause the computing device 150 to cause transmission of an out of stock alert signal to the electronic device 155 of a worker at the retail store to assign a task to the worker that requires the worker to visually inspect the product display shelf 110 to confirm the identity of the individual packages 190a-190d determined by the computing device 150 based on analysis of the image of the product display shelf 110 captured by the image capture device 120.

In some aspects, the manual control by an operator of the computing device 150 may be via the user interface 250 of the computing device 150, via another electronic device of the operator, or via another user interface and/or switch, and may include an option to override (i.e., remove) the out of stock event generated by the control circuit 210 in association with one or more of the individual packages 190a-190d located on the product display shelf 110. This manual override may be implemented in response to an input from the worker electronic device 155 that is based on a visual inspection of the product display shelf 110 by the worker, which indicates that the association of certain individual packages 190a-190d with an out of stock event appears to be erroneous. In some embodiments, the user interface 250 of the computing device 150 may also include a speaker 280 that provides audible feedback (e.g., alerts) to the operator of the computing device 150. It will be appreciated that the performance of such functions by the processor-based control circuit 210 of the computing device 150 is not dependent on a human operator, and that the control circuit 210 may be programmed to perform such functions without a human operator.

In some embodiments, the control circuit 210 of the computing device 150 is configured obtain (e.g., from the electronic database 140 or directly from the image capture device 120) an image of a product display shelf 110 that was captured by the image capture device 120. As described above, the image capture device 120 is positioned such that its field of view includes a portion of a product display shelf 110, or an entire product display shelf 110. In certain aspects, the image capture device 120 is configured to capture images of the product display shelf 110 at certain predetermined events (e.g., after the stocking or restocking of the product display shelf 110 by a worker, after the retail facility opens for the day, after the retail facility closes for the day, etc.), or at certain predetermined time intervals (e.g., every 2-3 minutes, 2-5 minutes, or 5-10 minutes). The images captured by the image capture device 120 may be transmitted to the electronic database 140 for storage in their original unprocessed form, or in processed form.

In particular, in some aspects, the image capture device 120 includes a control circuit with a processor programmed to process the images captured by the image capture device 120 and extract raw image data and metadata from the images, and to cause the image capture device 120 to transmit the data extracted from the images to the electronic database 140 for storage. In some aspects, the image capture device 120 captures images of the product display shelf 110 and transmits the obtained images to an Image Ingester service, which may be cloud-based, or which may be installed on the computing device 150 and executed by the control circuit 210.

In one aspect, the electronic database 140 includes an Azure Blob database and/or an Azure Cosmos database, and the Image Ingester service processes the images obtained from the image capture device 120 to extract raw image data and metadata from the images, and sends the extracted raw image data to the Azure Blob database, and sends the extracted image metadata to the Azure Cosmos database for storage. In some embodiments, the metadata extracted from the image captured by the image capture device 120 indicates the physical location of the image capture device 120 at the retail facility and/or the physical location of the portion of the product display shelf 110 depicted in the image and/or the physical characteristics (e.g., size, shape, etc.) of the individual packages 190*a*-190*d* (or empty spaces between the individual packages 190*a*-190*d*) captured in the image.

In some implementations, the control circuit 210 of the computing device is configured to detect portions of the product display shelf 110 and the individual packages 190*a*-190*d* stocked thereon, and to identify the products represented by the individual packages 190*a*-190*d* in the portion of the product display shelf 110 in the image. The control circuit 210 is likewise configured to detect/identify the product display areas 160*a*-160*d* stocking the individual packages 190*a*-190*d* and, more specifically, to detect the total number of individual packages 190*a*-190*d* in each of the product display areas 1601-160*d*, and to identify one or more product display areas 160*a*-160*d* where the total number of individual packages 190*a*-190*d* associated with one or more different products remaining on the product display shelf 110 warrants the generation of an out of stock event with respect to such products. In various embodiments, this object detection and product recognition is performed by the control circuit 210 via machine learning module comprising at least one trained neural network model. Some exemplary neural network model are described below.

Figure 3:
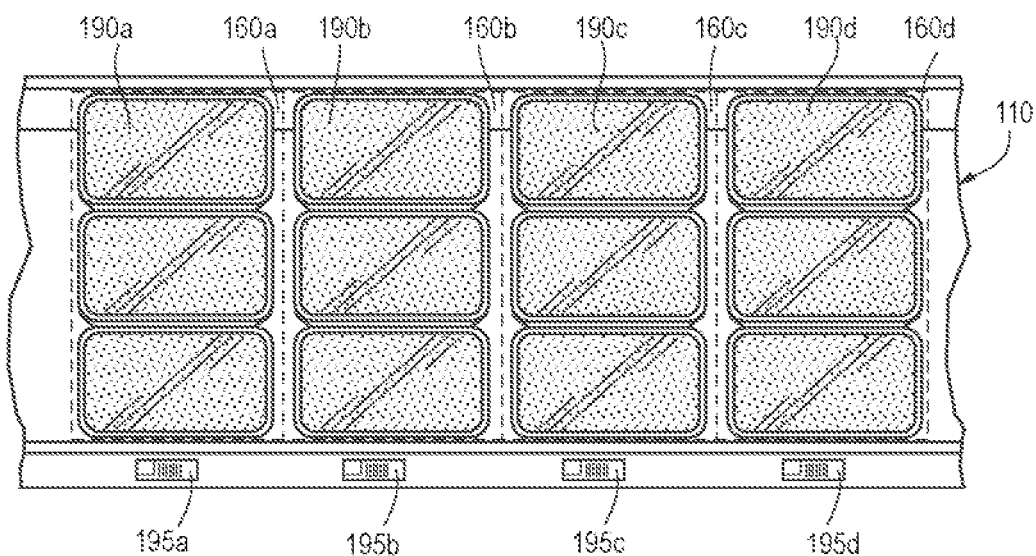
FIG. 3 depicts a product display shelf that is fully stocked with packages.

As used herein, a product display area 160*a*-160*d* refers to an area of the product display shelf 110 that is expected by the computing device 150 to include only individual packages (e.g., 190*a*) representing one product, i.e., one SKU (excluding situations where the individual packages 190*a*-190*d* are improperly stocked, or inadvertently shift from adjacent product display areas 160*a*-160*d* during the day). The exemplary product display areas 160*a*-160*d* defined for their respective packages 190*a*-190*d* are shown in FIG. 3 and generally represent four distinct surface areas of the product display shelf 110 where individual packages 190*a*-190*d* that appear to be identical (e.g., represent one and the same product/SKU) are expected to be grouped together.

In some embodiments, the control circuit 210 is configured to detect one or more obstructions in the field of view of the image capture device 120 represented in the obtained image via machine learning, e.g., an obstruction detection neural network (e.g., a deep convolutional neural network or any other suitable neural network). In certain aspects, the control circuit 210 of the computing device 150 is configured to process the image captured by each of the image capture devices 120 via the neural network, and analyze the presence of an obstruction (e.g., a worker, a customer, a shopping cart etc.) in the image that prevents the control circuit 210 from obtaining the threshold information needed (e.g., size and shape, identity, total number, etc.) about the packages 190*a*-190*d* on a given portion of the product display shelf 110 with a predefined required level of confidence.

In one aspect, even if a partial obstruction is detected in the image, the control circuit 210 is programmed to ignore the obstruction if the control circuit 210 determines that the obstruction does not obstruct enough of the image to prevent a high confidence object detection and identification in the image. On the other hand, the control circuit 210 (or the Image Ingester service) may be configured to discard an imaged captured by the image capture device 120 if it is determined that the image includes an object/person that obstructs the information depicted in the image (e.g., portions of the product display shelf 110, portions of the individual packages 190*a*-190*d*) that is critical for the control circuit 210 to detect and identify the individual packages 190*a*-190*d* on the product display shelf 110 with a required level of confidence. In one aspect, when the obstruction detection neural network model detects an unacceptable number (e.g., 1, 2, 3, etc.) of obstructions in the obtained image captured by the image capture device 120, the control circuit 210 is programmed to discard the obtained image without performing an out of stock analysis with respect to the portion of the product display shelf 110 depicted the obtained image.

In some embodiments, the image capture devices 120 are positioned such that two or more of the image capture devices 120 have overlapping fields of view, such that a portion of the product display shelf 110 falls within the overlapping fields of view of two or more of the image capture devices 120. Here, the control circuit 210 of the computing device 150 may be configured to process the image captured by each of the image capture devices 120, analyze the quality of the processed image based on one or more predefined quality factors using a neural network, and select the image determined by the control circuit 210, based on the applied quality factors, to be of higher quality. As such, the images which are of lesser or inferior quality may be discarded (i.e., deleted from the electronic database 140 to save storage space). In certain embodiments, the control circuit 210 of the computing device 150 is programmed to determine whether the overall quality of the image captured by the image capture device 121 is sufficient to make a high confidence determination regarding the overall size and shape, identity, and total number of the individual packages 190*a*-190*d* located on (and missing from) the portion of the product display shelf 110. For example, if the control circuit 210 determines (based on analyzing certain image quality factors) that the obtained image is of insufficient quality, then the computing device 150 would discard the image.

In some embodiments, the control circuit 210 is configured to detect one or more obstructions in the field of view of the image capture device 120 represented in the obtained image via machine learning, e.g., an obstruction detection neural network (e.g., a deep convolutional neural network or any other suitable neural network). In certain aspects, the control circuit 210 of the computing device 150 is configured to process the image captured by each of the image capture devices 120 via the neural network, and analyze the presence of an obstruction (e.g., a worker, a customer, a shopping cart etc.) in the image that prevents the control circuit 210 from obtaining the threshold information needed (e.g., size and shape, identity, total number, etc.) about the packages 190*a*-190*d* on a given portion of the product display shelf 110 with a predefined required level of confidence.

In some aspects, the control circuit 210 is configured to process the data extracted from each image captured by the image capture device 120 in order to detect the overall size and shape of each of the individual packages 190*a*-190*d* on the product display shelf 110 that are captured in the image. For example, the control circuit 210 may be configured to process the data extracted from each image and detect each of the individual packages 190*a*-190*d* in the image via machine learning and computer vision models that may include a neural network (e.g., a deep convolutional neural network.)

In some embodiments, the control circuit 210 is configured to process, via one or more neural networks, the data extracted from each image captured by the image capture device 120 in order to detect the objects (e.g., the individual packages 190*a*-190*d*) to determine a total number of the individual packages 190*a*-190*d* captured in the image, identify the product display areas 160a-160d (each of which is meant to contain only individual packages 190a-190d that represent one SKU), and determine a total number of the individual packages 190-190d that are grouped together in their respective product display areas 160a-160d. For example, an analysis by the control circuit 210 of an image depicting the product display shelf 110 in FIG. 3 via the object detection neural network would reveal that 12 individual packages 190a-190d are stocked on the shelf, with 3 packages 190a representing one distinct product being located in product display area 160a, 3 packages 190b representing another distinct product being located in product display area 160b, 3 packages 190c representing yet another distinct product being located in product display area 160c, and 3 packages 190d representing another distinct product being located in product display area 160d.

The object detection neural network may be trained for improved object detection and identification using various data stored in the electronic database 140, for example: raw image data extracted from the images captured by the image capture device 120; metadata extracted from the images captured by the image capture device 120; reference image data associated with reference images of various products that are sold at the retail facility, reference image data associated with reference images of various previously defined product display areas 160a-160, reference data indicative of virtual boundary lines previously generated to surround the previously defined product display areas 160a-160d; and reference data indicative of product identifiers previously assigned to the previously defined product display areas 160a-160d. Examples of exemplary embodiments of methods and systems for defining product display areas 160a-160d in association with the packages 190a-190d, generating virtual boundary lines surrounding the defined product display areas 160a-160d, and assigning a unique product identifier to each of the product display areas 160a-160d are discussed in more detail in co-pending application entitled "SYSTEMS AND METHODS OF DEFINING AND IDENTIFYING PRODUCT DISPLAY AREAS ON PRODUCT DISPLAY SHELVES," filed Apr. 22, 2020, which is incorporated by reference herein in its entirety.

In some embodiments, the control circuit 210 is configured to utilize a product recognition neural network model, which is trained to recognize the identity of the distinct products represented by each of the groups of the individual packages 190a-190d, to correlate the data extracted from each image captured by the image capture device 120 to the product display area data (indicating the store planogram and/or the reference product display areas 160a-160d associated each of the different products on the product display shelf 110) stored in the electronic database 140. This correlation via the product recognition neural network enables the control circuit 210 to recognize the specific identity (e.g., by determining the unique identifier) of the products represented by the individual packages 190a-190d in the portion of the product display shelf 110 in the image and the product display areas 160a-160d stocking the individual packages 190d-190d associated with the products.

In one approach, the identifier determined by the control circuit 210 to be associated with a group of packages (e.g., 190a) located in a given product display area (e.g., 160a) is a the GTIN, which is a globally-recognized identifier used by manufacturers to uniquely identify their products. It will be appreciated that, the control unit 210 is not limited to recognizing the identity of the products by using only GTIN, and is configured to recognize the identity of the products on the product display shelf 110 using any other unique alphanumeric or nonalphanumeric identifier that may be assigned to a given product by the manufacturer and/or retailer (e.g., SKU number, QR code, an RFID tag, or the like). For example, with reference to FIG. 3, this correlation may result in the control circuit 210 identifying the packages 190a located in product display area 160a as containing chicken drumsticks, identifying the packages 190b located in product display area 160b as containing chicken wings, identifying the packages 190c located in product display area 160c as containing sliced ham, and identifying the packages 190d located in product display area 160d as containing sliced turkey breast.

In some aspects, after the identity of the product represented by the individual packages 190a-190d and after the boundaries of the product display areas 160a-160d where each of the individual packages 190-190d is expected to be properly located is determined by the control circuit 210 with a degree of confidence that exceeds a predefined threshold, the control circuit 210 of the computing device is configured to process, via a messiness detection neural network, the data extracted from each image captured by the image capture device 120 to detect the degree of messiness of the product display shelf 110.

The degree of messiness of the product degree shelf 110 is used herein to refer to a number or a percentage of the individual packages 190a-190d that have shifted/were moved relative to their initially stocked positions and/or that are located in product display areas 160a-160d where they are not expected to be (i.e., product display areas 160a-160d where a group of different product packages is expected to be located). This "messiness" of the product display shelf 110 may occur due to incorrect placement of a given package (e.g., 190a) into the wrong product display area (e.g., 160b) by a worker during restocking of the shelf and/or inadvertent shifting of the packages 190a-190d from their designated product display areas 160a-160d into adjacent product display areas 160-160d as a result of, for example, removal of one or more of the packages 190a-190d from the product display shelf 110 by consumers. For example, an analysis by the control circuit 210 of an image depicting the product display shelf 110 in FIG. 1 via the messiness detection neural network would reveal that, relative to the originally stocked locations of the packages 190a-190d seen in FIG. 3, none of the packages remaining on the shelf have shifted into an adjacent product display area 160a-160d where they are not expected to be.

In some aspects, after the identity of the product represented by the individual packages 190a-190d and after the boundaries of the product display areas 160a-160d where each of the individual packages 190-190d is expected to be properly located is determined by the control circuit 210 with a degree of confidence that exceeds a predefined threshold, the control circuit 210 of the computing device is configured to process, via a gap detection neural network, the data extracted from each image captured by the image capture device 120 in order to detect one or more empty spaces or gaps created on the product display shelf 110 relative to the fully stocked state shown in FIG. 3 as a result of the removal of the packages 190a-190d from the product display shelf 110 by customers of the retail facility throughout the day.

Figure 4:
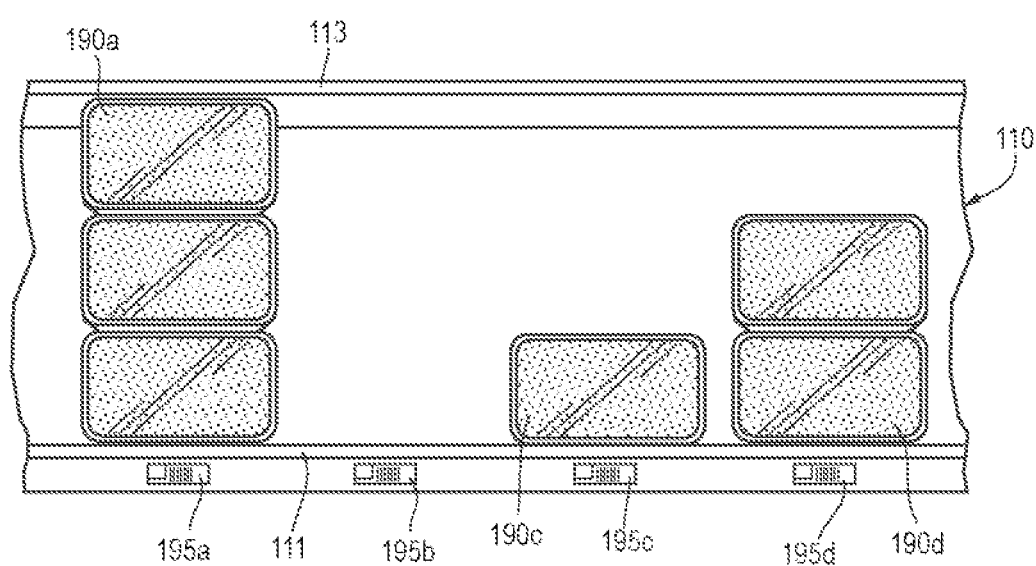
FIG. 4 depicts the product display shelf of FIG. 3, but with some of the packages having been removed from the product display shelf by the customers of the retail facility.

An exemplary state of the product display shelf 110 of FIG. 3 depicted in an image captured by the image capture device 120 after some of the packages stocked on the product display shelf 110 at the beginning of the day were purchased by consumers is shown in FIG. 4. Notably, in some embodiments, in order to facilitate an accurate monitoring of on-shelf inventory at the retail facility, the image capture device 120 is configured to capture an image of the product display shelf 110 after the product display shelf 110 is fully stocked (as shown in FIG. 3), and the control circuit 210 of the computing device 150 is programmed to obtain the image and process the image to generate new updated data indicative of both the number of packages 190a-190d on the product display shelf 110 and the identity of the product represented by these packages 190a-190d, and to transmit a signal to update the electronic database 140 to include this newly-generated data, which may then be analyzed by the control circuit 210 to determine the number of packages 190a-190d removed from the product display shelf 110 and/or the presence of empty spaces 115a-115c created by removal of certain packages 190a-190d relative to their fully stocked state.

As can be seen in FIG. 4, relative to the fully stocked state of the product display shelf 110, a total of 6 packages were removed from the product display shelf 110, namely, all three packages 190b, two packages 190c, and one package 190d. More specifically, an analysis by the control circuit 210 of an image depicting the product display shelf 110 in FIG. 4 via the gap detection neural network would result in a determination by the control circuit 210 that, relative to the originally stocked locations of the packages 190a-190d seen in FIG. 3, a gap or empty space 115a has been created due to the removal of all three of package 190b, a gap or empty space 115b has been created due to the removal of two of packages 190c, and a gap or empty space 115c has been created due to the removal of one of the packages 190d.

In certain aspects, in conjunction with the detection by the control circuit 210 of the empty spaces created by removal of purchased packages 190a-190d, or as a separate processing/analysis, the control circuit 210 is configured to determine, via a binary classification neural network, the data extracted from each image captured by the image capture device 120 in order to determine how many packages 190a-190d are in stock on the product display shelf 110 and how many packages 190a-190d are out of stock. For instance, an analysis by the control circuit 210 via the binary classification neural network would result in a determination by the control circuit 210 that 6 packages (i.e., 3 of 190a, 1, of 190c, and 2 of 190d) are in stock and 6 packages (i.e., 3 of 190b, 2 of 190c, and a of 190d) are out of stock.

In certain aspects, in conjunction with this determination by the control circuit 210, or as a separate processing/analysis, the control circuit 210 is configured to determine, via a segmentation neural network, the data extracted from each image captured by the image capture device 120 in order to determine what percentage of the product display shelf 110 is empty. For instance, exemplary analysis/processing of the image by the control circuit 210 via the segmentation neural network would result in a calculation of the Intersection Over Product Area (IOPA) score, which is reflective of a percentage of the surface area of the product display shelf 110 that is located in the gaps located between the packages 190a-190d remaining on the product display shelf 110. Generally, this analysis is similar to the gap detection analysis and permits the control circuit 210 to determine how empty or full a given product display shelf 110 is.

In some aspects, the control circuit 210 is configured to process and analyze an image obtained from the image capture device 120 in order to determine how well a given product sells at the retail facility. For example, the control circuit 210 may be programmed to correlate the obtained image to the product display area data stored in the electronic database 140 (which indicates the reference product display areas 160a-160d (indicating the fully stocked state of the packages 190a-190d) associated with each of the different products on the product display shelf 110 in order to determine the total number of the individual packages 190a-190d remaining on the product display shelf 110 and the total number of the individual packages 190a-190d that have been removed from the product display shelf 110. FIG. 1 depicts the product display shelf 110 at a later but known point in time (since each image preferably includes time-stamp metadata) relative to the time when the product display shelf 110 was fully stocked (as in FIG. 3). As such, the control circuit 210 is able to determine that, over a known period of time, three packages 190b were removed (leaving the empty space 115a), two packages 190c were removed (leaving the empty space 115b), and one package 190d was removed (leaving the empty space 115c). This permits the control circuit 210 to calculate a sales velocity of a product associated with the individual packages 190a-190d stocked on the product display shelf 110. In the above example, the product that has the highest sales velocity is the product represented by the packages 190b and the product that has the lowest sales velocity is the product represented by the packages 190a.

In some aspects, after the control circuit 210 is able to determine, via one or more of the above-described neural network models, the identity of the products represented by the individual packages 190a-190d, the boundaries of the product display areas 160a-160d where each of the individual packages 190-190d is expected to be properly located, the number of packages 190a-190d remaining on the product display shelf, and the number of packages 190a-190d removed from the product display shelf 110, the control circuit 210 of the computing device is configured to identify one or more product display areas where at least one of the individual packages 190a-190d of the identified products is associated with an out of stock event. As mentioned above, an out of stock event refers to a situation, where either all of the individual packages representing a given product (e.g., 190b) are sold out and not present in their designated product display area (e.g., 160b) on the product display shelf 110, or a situation, where the number of packages remaining representing a given product (e.g., 190c or 190d) on the product display shelf 110 is equal to or below a predefined minimum number (e.g., 1 or 2, respectively) that would trigger a replenishment task for the product associated with the individual packages.

In certain embodiments, in response to an identification by the control circuit 210 of one or more product display areas 160a-160d where the individual packages 190a-190d of the identified products are associated with an out of stock event, the control circuit 210 is programmed to generate out of stock alert. In one aspect, after an initial prediction that one of the packages 190a-190d on the product display shelf 110 is associated with an out of stock event the control circuit 210 is programmed to determine the confidence level of this prediction, i.e., to determine the percentile range around the prediction that the actual value would be expected to fall within.

In certain embodiments, if the confidence level of the out of stock event prediction is determined by the control circuit 210 to be above a preset threshold (e.g., 90%), the control circuit 210 is programmed to communicates an out of stock alert to the electronic database 140. In addition, in certain aspects, the control circuit 210 is programmed to cause the computing device 150 to transmit the out of stock alert as a signal to the electronic device 155 of a worker at the retail facility, and this signal causes the electronic device 155 of the worker to display a visual alert on the screen of the worker electronic device 155 and/or to emit an audible alert via a speaker of the worker electronic device 155. This alert notifies the worker that one or more of the packages 190a-190d are associated with an out of stock event and tasks the worker with replenishing the product display shelf 110 with a number of the packages 190a-190d that would return the product display shelf 110 to its fully stocked state (as shown in FIG. 4). In some aspects, the control circuit 210 is programmed to transmit the out of stock alert to the electronic database 140 and/or the worker electronic device 155 in response to obtaining a predetermined number of consecutive images (e.g., 2, 3, 5, etc.) determined by the control circuit 210 to be indicative that the packages 190a-190d in a given product display area 160a-160d are associated with the out of stock event.

In certain aspects, after a worker who received the out of stock alert on the worker's electronic device 155 determines (i.e., by visual inspection) that one or more packages (e.g., 190b) determined by the control circuit 210 to be associated with an out of stock event are in fact associated with an out of stock event (since no packages 190b remain on the product display shelf 110), the worker can manually enter into his/her electronic device 155 an input indicating that the out of stock alert was correctly generated by the control circuit 210 with respect to the packages 190. After this input is received from the worker electronic device 155, in some embodiments, the computing device 150 transmits a signal (to the electronic device 155 of the same worker or a different worker), the signal including an instruction to the worker to replenish the product display shelf 210. On the other hand, in situations, when a worker who received the out of stock alert on the worker's electronic device 155 determines (i.e., by visual inspection) that one or more packages (e.g., 190a) determined by the control circuit 210 to be associated with an out of stock event are actually not associated with an out of stock event (since the number of packages 190a remaining on the product display shelf 110 in FIG. 1 represents the fully stocked state of the packages 190a (see, e.g., FIG. 3), the worker can manually enter into his/her electronic device 155 an input indicating the specific packages (e.g., 190a) for which the out of stock alert was incorrectly generated by the control circuit 210. After this input is received from the worker electronic device 155, the control circuit 210 is programmed to analyze which neural network model contributed to the incorrect out of stock event determination by the control circuit 210, and to retrain such a neural network using model using additional image data in order to increase the probability of a more accurate determination of an out of stock event next time.

Figure 5:
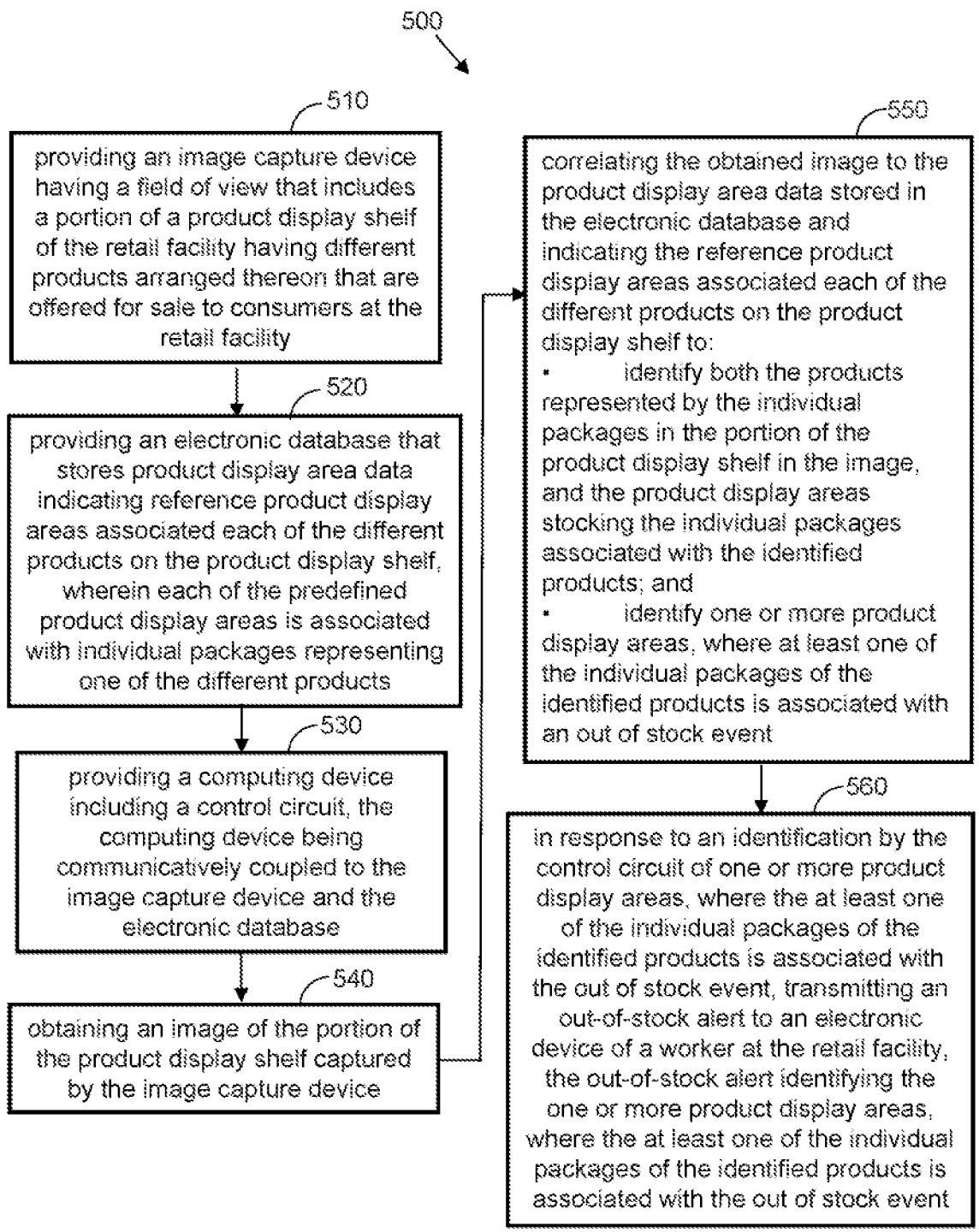
FIG. 5 is a flow chart diagram of a process of managing inventory in accordance with some embodiments.

FIG. 5 shows an embodiment of an exemplary method 500 of a method of managing inventory of a retail facility. The method 500 includes providing an image capture device 120 having a field of view that includes a product display shelf 110 of the retail facility having different products arranged thereon and offered for sale to consumers (step 510). In addition, the method 500 includes providing an electronic database 140 that stores product display area data indicating reference product display areas 160a-160d associated each of the different products on the product display shelf 110 (step 520). As mentioned above, each of the predefined reference product display areas 160a-160d is associated with individual packages 190a-190d representing one of the different products, and a total number of the individual packages 190a-190d in each of the reference product display areas 160a-160d indicates a state of the reference product display areas 160a-160d when fully stocked with individual packages 190a-190d. The method 500 further includes providing a computing device 150 including a control circuit 210 and communicatively coupled to the image capture device 120 and the electronic database 140 (step 530).

In certain aspects, the image capture device 120 is configured to capture images of the product display shelf 110 at certain predetermined events (e.g., restocking of the product display shelf 110) or predetermined intervals (e.g., every 2-5 minutes). The images captured by the image capture device 120 are then transmitted to the electronic database 140 for storage in their original unprocessed form, or in their processed form, where the raw image data is separated from the image metadata. In the embodiment illustrated in FIG. 5, the method 500 further includes obtaining, by the computing device 150, an image of a product display shelf 110 captured by the image capture device 120 (step 540).

In certain implementations, the computing device 150 does not necessarily obtain the actual image that was captured by the image capture device 120, but obtains raw image data and/or metadata extracted from the image during processing (which processing may be done by the image capture device 120, or a separate cloud-based service such as Image Ingester). After the image/image data is obtained by the computing device 150, the method 500 further includes correlating, by the control circuit 210 of the computing device 150, the obtained image to the product display area data stored in the electronic database 140 in order to: (1) identify both the products represented by the individual packages 190a-190d in the portion of the product display shelf 110 in the image; (2) identify the product display areas 160a-160d stocking the individual packages 190a-190d associated with the identified product packages 190a-190d; and (3) identify one or more product display areas 160a-160d where at least one of the individual packages 190a-190d is associated with an out of stock event (step 550). As described above, this correlation may be performed by the control circuit 210 by utilizing one or more neural network models, which may be trained using various data sets stored in the electronic database 140 and may be retrained in response to the control circuit 210 receiving, after a retail facility workers performs a physical inspection of a given product display shelf 110 at the retail facility, input from the electronic device 155 of the worker that contradicts the out of stock event prediction by the control circuit 210.

In some embodiments, the control circuit 210 may be programmed to detect (e.g., via OCR) information on a shelf label (e.g., 195a-195d in FIG. 1) including but not limited to: price information (e.g. price in dollars per unit/weight), product location information (e.g., zone/location at retail facility where the label is locate), and product identifier information (e.g., unique sequence identifier associated with the product associated with the on-shelf label). In certain aspects, by correlating one or more of price information, product location information, and product identifier information recognized on the detected on-shelf label, the control circuit 210 of the computing device is able to determine whether the on-shelf label information matches the determined identity of the packages 190a-190d in the defined product display areas 160a-160d, which provides for enhanced modular compliance (i.e., each product packages 190a-190d being located in the location where it is expected to be located according to the store planogram) at the retail facility. In some aspects, the control unit 210 is programmed to perform this correlation via a label character recognition neural network model.

In some embodiments, when it is determined, e.g., by a physical inspection of the product display shelf 110 by a worker, or by subsequent analysis by the control circuit 210 of the product labels 195a-195d, that the control circuit 210 defined product display areas 160a-160d correctly and identified the individual packages 190a-190d correctly, the control unit 210 transmits a signal to the electronic database 140 indicating that the initially determined identity of the packages 190a-190d has been verified by on-shelf label character detection-based verification. When it is determined, e.g., by a physical inspection of the product display shelf 110 by a worker, or by subsequent analysis by the control circuit 210 of information on the product labels 195a-195d, that the product display areas 160a-160d or the individual packages 190a-190d were defined or identified by the control circuit 210 incorrectly, the machine learning function of the system 100 provides for a retraining of the label neural network model responsible for the error to ensure a more precise object detection/identification next time, which provides for enhanced modular compliance.

Finally, after the product display areas 160a-160d are defined and the individual packages 190a-190d located on the product display shelf 110 are identified, and after the control circuit 210 of the computing device identifies one or more product display areas 190a-190d where one or more of the individual packages 190a-190d of the identified products is associated with the out of stock event, the method 500 further includes transmitting an out of stock alert to an electronic device 155 of a worker at the retail facility, with the out-of-stock alert identifying the one or more product display areas 160a-160d having one or more individual packages 190a-190d associated with the out of stock event. This out of stock alert causes a worker at the retail facility to physically inspect the product display shelf 110 and/or to replenish the out of stock packages 190a-190d on the product display shelf 110.

An exemplary logic flow 600 indicative of a method of inventory management processed according to some implementations is represented FIG. 6. First, a worker fully stocks a product display shelf 110 and indicates that this task has been performed via the workers' electronic device 155 (step 610). Then, at a predetermined time (e.g., right after the worker fully stock the product display shelf, or 2-5 minutes later), the image capture device 120 captures one or more images of the product display shelf 110 (step 620). Then, the obtained images are analyzed by the control circuit 210 via one or more of the above-described neural network models (630). As mentioned above, some of the neural network models that are usable in conjunction with the methods and systems described therein include but are not limited to: an object detection neural network model, a product recognition neural network model, an obstruction detection neural network model, a gap detection neural network model, a segmentation detection neural network model, a binary classifier neural network model, and a messiness detection neural network model.

If, based on the analysis of the obtained image by the control circuit 210 via the neural network models results in a determination by the control circuit 210 that one or more of the product display areas 160a-160d on the product display shelf 110 has packages 190a-190d that are associated with an out of stock event (e.g., no packages left on the shelf, or number of packages on the shelf is below the replenishment trigger threshold), the control circuit 210 transmits an out of stock event alert to a worker electronic device 155, which requires the worker to manual inspect the product display area 160a-160d on the product display shelf 110 that is estimated to be experiencing an out of stock event (step 640).

If, after a manual inspection of the product display area 160a-160d on the product display shelf 110 that is estimated to be experiencing an out of stock event, the worker confirms the out of stock event, i.e., by entering data into the worker's electronic device 155, in response to receipt of this data from the worker's electronic device 155, the control circuit 210 of the computing device 150 is programmed to send this data confirming the out of stock event to the electronic database 140 (step 650). In addition, an electronic notification is then transmitted (e.g., by the computing device 150) to an electronic device 155 of a worker to assign a task to the worker to replenish the product display shelf 110 to fully stock the product display shelf 110 (step 660).

On the other hand, if, after a manual inspection of the product display area 160a-160d on the product display shelf 110 that is estimated to be experiencing an out of stock event, the worker indicates the erroneous nature of the out of stock event, i.e., by entering data into the worker's electronic device 155, in response to receipt of this data from the worker's electronic device 155, the control circuit 210 of the computing device 150 is programmed to utilize this data to retrain one or more of the neural network models determined to have contributed to the erroneous estimation of the existence of the out of stock event (step 670). As a result of this retraining of one or more of the neural network models with such feedback data, the neural network models are trained to provide for more accurate out of stock event predictions (step 680).

The above described exemplary embodiments advantageously provide for inventory management systems and methods, where the individual packages for each separate product stocked on product display shelves at the retail facility are grouped together in their respective product display areas, and the number of products taken off the product display shelf as well as the number of products remaining on the product display shelf can be easily determined, facilitating automatic generation of out of stock events in association with certain products, which in turn leads to timely replenishment of such products on the product display shelf. As such, the systems and methods described herein provide for an efficient and precise monitoring of on-shelf product inventory at a retail facility, and provide a significant boost in revenue to the retail facility by avoiding loss of sale situations where consumers are interested in buying a product, but the product is not available on the product display shelf on the sales floor.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An inventory management system for a retail facility, the system comprising:
    a plurality of image capture devices fixedly mounted to at least one stationary support structure located above a sales floor of the retail facility such that each of the plurality of the image capture devices has a field of view that includes a portion of a product display shelf of the retail facility having different products arranged thereon that are offered for sale to consumers at the retail facility;

an electronic database that stores product display area data indicating reference product display areas associated with each of the different products on the product display shelf, wherein each of the reference product display areas is associated with individual packages representing one of the different products, and wherein a total number of the individual packages in the reference product display areas indicates a state of the reference product display areas when fully stocked; and a computing device including a control circuit, the computing device being communicatively coupled to the image capture device and the electronic database, wherein the control circuit:

obtains an image of the portion of the product display shelf captured by an image capture device of the plurality of the image capture devices;

processes the image of the portion of the product display shelf captured by the image capture device to individually define product display areas of the shelf detected in the image by generating a boundary line data set including a virtual bounding line extending around each of the product display areas of the shelf detected in the image, such that each of the product display areas of the shelf detected in the image is surrounded by a respective virtual bounding line;

correlates the boundary line data set obtained by processing the image to the product display area data stored in the electronic database and indicating the reference product display areas associated with each of the different products on the product display shelf to:

identify both the products represented by the individual packages on the portion of the product display shelf captured in the image and the reference product display areas matching the boundary line set associated with the product display areas detected in the image and stocking the individual packages associated with the identified products; and identify one or more of the product display areas where at least one of the individual packages of the identified products is associated with an out of stock event; and in response to an identification by the control circuit of the one or more product display areas where the at least one of the individual packages of the identified products is associated with the out of stock event, transmits an out of stock alert to an electronic device of a worker at the retail facility, the out of stock alert identifying the one or more product display areas where the at least one of the individual packages of the identified products is associated with the out of stock event; and wherein each of the product display areas of the shelf surrounded by a respective virtual bounding line, when fully stocked, includes a plurality of the individual packages representing an identical product.

2. The system of claim 1, wherein the control circuit identifies the products represented by the individual packages in the portion of the product display shelf in the image, the product display areas stocking the individual packages associated with the identified products, and one or more product display areas, where the individual packages of the identified products are associated with the out of stock event via a machine learning module comprising at least one trained neural network model that comprises:

an obstruction detection neural network model that detects a presence of one or more obstructions in the field of view of the image capture device;

a gap detection neural network model that determines if there are empty spaces between the individual packages in their respective product display area;

a segmentation detection neural network model that determines a percentage of empty spaces between the individual packages in their respective product display area;

a messiness detection neural network model that determines whether the individual packages have shifted relative to their initially stocked position in their respective product display area;

an object detection neural network model that determines counts of the individual packages in their respective product display area;

a product recognition neural network model that recognizes the products associated with the individual packages in their respective product display area;

a label character recognition neural model that facilitates a verification, by the control circuit, that information on a label associated with the individual packages in their respective product display areas corresponds to product identifiers assigned in the electronic database to the identified products; and a binary classification neural network model that detects presence or absence of the individual packages of the products in their respective product display area.

3. The system of claim 2, wherein the control circuit:

receives a signal from the electronic device of the worker indicating, based on the worker inspecting the product display shelf, whether the out of stock alert was generated by the control circuit correctly or in error;

if the signal received from the electronic device of the worker indicates that the out of stock alert was correctly generated by the control circuit, causes the computing device to transmit an instruction to one or more workers at the retail facility to restock the product display shelf with additional individual packages of a product that was determined to be associated with the out of stock event; and if the signal received from the electronic device of the worker indicates that the out of stock alert was correctly generated by the control circuit, retrains the at least one neural network model.

4. The system of claim 2, wherein, when the obstruction detection neural network model detects a presence of one or more obstructions in the obtained image captured by the image capture device, the control circuit discards the obtained image without performing an out of stock analysis with respect to the obtained image.

5. The system of claim 1, wherein the control circuit determines a confidence level for the identification by the control circuit of one or more product display areas, where the individual packages of the identified products are associated with the out of stock event; and if the confidence level is above a preset threshold, the control circuit communicates the out of stock alert to the electronic database.

6. The system of claim 1, wherein the image capture device comprises one or more of: a barcode (e.g., electronic product code (EPC), universal product code (UPC), European article number (EAN), global trade item number (GTIN) readers, quick response (QR) code readers, radio frequency identification (RFID) readers, stock keeping unit (SKU) readers, near field communication (NFC) readers, a digital camera, and a mobile electronic device; and wherein the image capture device captures images at predetermined intervals and to automatically send the captured images to the control circuit for analysis.

7. The system of claim 6,
wherein the control circuit transmits the out of stock alert in response to obtaining a predetermined number of consecutive images determined by the control circuit to be indicative that the one or more of the product display areas have products associated with the out of stock event.

8. The system of claim 1,
wherein the image capture device includes at least two image capture devices having overlapping fields of view, such that the portion of the product display falls within the overlapping fields of view of the at least two image capture devices; and
wherein the control circuit processes the image captured by each of the at least two image capture devices and select the image determined by the control circuit, based on one or more quality factors, to be of higher quality.

9. The system of claim 1, wherein the control circuit:
correlates the obtained image to the product display area data stored in the electronic database and indicating the reference product display areas associated with each of the different products on the product display shelf to determine a total number of the individual packages in a selected product display area of the product display shelf; and
correlates the total number of the individual packages in a selected product display area of the product display shelf to the total number of the individual packages in a selected reference product display area corresponding to the selected product display area when the selected reference product display area is fully stocked to determine a number of the individual packages removed from the selected product display area by consumers and calculate a sales velocity of a product associated with the removed individual packages.

10. The system of claim 1, wherein the control circuit:
obtains a new image following a restocking of the product display shelf;
generates new product display data to include a new reference product display area based on the obtained new image following the restocking of the product display shelf; and
transmits a signal to update the electronic database to include the new product display data including the new reference product display area based on the obtained new image following the restocking of the product display shelf.

11. The system of claim 1, wherein the out of stock alert assigns a task to the worker to replenish, with additional products, the one or more product display areas where the at least one of the individual packages of the identified products is associated with the out of stock event.

12. A method for managing inventory, the method comprising:
providing a plurality of image capture devices fixedly mounted to at least one stationary support structure located above a sales floor of the retail facility such that each of the plurality of the image capture devices has a field of view that includes a portion of a product display shelf of a retail facility having different products arranged thereon that are offered for sale to consumers at the retail facility;
providing an electronic database that stores product display area data indicating reference product display areas associated with each of the different products on the product display shelf, wherein each of the reference product display areas is associated with individual packages representing one of the different products, and wherein a total number of the individual packages in the reference product display areas indicates a state of the reference product display areas when fully stocked;
providing a computing device including a control circuit, the computing device being communicatively coupled to the image capture device and the electronic database; and
by the control circuit:
obtaining an image of the portion of the product display shelf captured by an image capture device of the plurality of the image capture devices;
processing the image of the portion of the product display shelf captured by the image capture device to individually define product display areas of the shelf detected in the image by generating a boundary line data set including a virtual bounding line extending around each of the product display areas of the shelf detected in the image, such that each of the product display areas of the shelf detected in the image is surrounded by a respective virtual bounding line;
correlating the boundary line data set obtained by the processing of the image to the product display area data stored in the electronic database and indicating the reference product display areas associated with each of the different products on the product display shelf to:
identify both the products represented by the individual packages on the portion of the product display shelf captured in the image and the reference product display areas matching the boundary line set associated with the product display areas detected in the image and stocking the individual packages associated with the identified products; and
identify one or more of the product display areas where at least one of the individual packages of the identified products is associated with an out of stock event; and
in response to an identification by the control circuit of the one or more product display areas where the at least one of the individual packages of the identified products is associated with the out of stock event, transmitting an out-of-stock alert to an electronic device of a worker at the retail facility, the out-of-stock alert identifying the one or more product display areas, where the at least one of the individual packages of the identified products is associated with the out of stock event; and
wherein each of the product display areas of the shelf surrounded by a respective virtual bounding line, when fully stocked, includes a plurality of the individual packages representing an identical product.

13. The method of claim 12, further comprising, by the control circuit, identifying the products represented by the individual packages in the portion of the product display shelf in the image, the product display areas stocking the individual packages associated with the identified products, and one or more product display areas, where the individual packages of the identified products are associated with the out of stock event via a machine learning module comprising at least one trained neural network model that comprises:
- an obstruction detection neural network model that detects a presence of one or more obstructions in the field of view of the image capture device;
- a gap detection neural network model that determines if there are empty spaces between the individual packages in their respective product display area;
- a segmentation detection neural network model that determines a percentage of empty spaces between the individual packages in their respective product display area;
- a messiness detection neural network model that determines whether the individual packages have shifted relative to their initially stocked position in their respective product display area;
- an object detection neural network model that determines counts of the individual packages in their respective product display area;
- a product recognition neural network model that recognizes the products associated with the individual packages in their respective product display area;
- a label character recognition neural model that facilitates a verification, by the control circuit, that information on a label associated with the individual packages in their respective product display areas corresponds to product identifiers assigned in the electronic database to the identified products; and
- a binary classification neural network model that detects presence or absence of the individual packages of the products in their respective product display area.

14. The method of claim 13, further comprising, by the control circuit:
- receiving a signal from the electronic device of the worker indicating, based on the worker inspecting the product display shelf, whether the out of stock alert was generated by the control circuit correctly or in error;
- if the signal received from the electronic device of the worker indicates that the out of stock alert was correctly generated by the control circuit, causing, by the control circuit, the computing device to transmit an instruction to one or more workers at the retail facility to restock the product display shelf with additional individual packages of a product that was determined to be associated with the out of stock event; and
- if the signal received from the electronic device of the worker indicates that the out of stock alert was correctly generated by the control circuit, retraining, by the control circuit, the at least one neural network model.

15. The method of claim 12, further comprising, by the control circuit, determining a confidence level for the identification by the control circuit of one or more product display areas, where the individual packages of the identified products are associated with the out of stock event; and
- if the confidence level is above a preset threshold, causing, by the control circuit, the computing device to transmit the out of stock alert to the electronic database for storage.

16. The method of claim 12,
- wherein the image capture device comprises one or more of: a barcode (e.g., electronic product code (EPC), universal product code (UPC), European article number (EAN), global trade item number (GTIN) readers, quick response (QR) code readers, radio frequency identification (RFID) readers, stock keeping unit (SKU) readers, near field communication (NFC) readers, a digital camera, and a mobile electronic device; and
- further comprising capturing, by the image capture device, images at predetermined intervals and automatically sending the captured images to the control circuit for analysis.

17. The method of claim 16, further comprising, by the control circuit, transmitting the out of stock alert in response to obtaining a predetermined number of consecutive images determined by the control circuit to be indicative that the one or more of the product display areas have products associated with the out of stock event.

18. The method of claim 12, further comprising, in response to the obstruction detection neural network model detecting a presence of one or more obstructions in the obtained image captured by the image capture device, the control circuit discarding the obtained image without performing an out of stock analysis with respect to the obtained image.

19. The method of claim 12,
- wherein the image capture device includes at least two image capture devices having overlapping fields of view, such that the portion of the product display falls within the overlapping fields of view of the at least two image capture devices; and
- further comprising processing, by the control circuit, the image captured by each of the at least two image capture devices and selecting the image determined by the control circuit, based on one or more quality factors, to be of higher quality.

20. The method of claim 12, further comprising, by the control circuit:
- correlating the obtained image to the product display area data stored in the electronic database and indicating the reference product display areas associated with each of the different products on the product display shelf to determine a total number of the individual packages in a selected product display area of the product display shelf; and
- correlating the total number of the individual packages in a selected product display area of the product display shelf to the total number of the individual packages in a selected reference product display area corresponding to the selected product display area when the selected reference product display area is fully stocked to determine a number of the individual packages removed from the selected product display area by consumers and calculate a sales velocity of a product associated with the removed individual packages.

21. The method of claim 12, further comprising, by the control circuit:
- obtaining a new image following a restocking of the product display shelf;
- generating new product display data to include a new reference product display area based on the obtained new image following the restocking of the product display shelf; and
- transmitting a signal to update the electronic database to include the new product display data including the new reference product display area based on the obtained new image following the restocking of the product display shelf.

* * * * *